United States Patent [19] [11] 3,764,529
Matsuo et al. [45] Oct. 9, 1973

[54] METHOD OF MANUFACTURING FINE GRAIN CERAMIC BARIUM TITANATE

[75] Inventors: Yoshihiro Matsuo, Neyagawa; Hiromu Sasaki, Kadoma; Shigeru Hayakawa, Hirakata, all of Japan

[73] Assignee: Matsushita Electric Industrial Co. Ltd., Osaka, Japan

[22] Filed: Feb. 17, 1972

[21] Appl. No.: 227,306

[52] U.S. Cl............ 252/1, 106/46, 106/63, 106/306, 252/62.3 BT
[51] Int. Cl............................................. C09k 1/60
[58] Field of Search................... 252/1, 62.3 BT; 106/46, 63, 306

[56] References Cited
UNITED STATES PATENTS
3,028,248   4/1962   Glaister................................ 106/39
3,673,119   6/1972   Veoka et al. ....................... 252/520

OTHER PUBLICATIONS
Chemical Abstracts 75, 52351 (Costell et al.)

Primary Examiner—George F. Lesmes
Assistant Examiner—William R. Dixon, Jr.
Attorney—E. F. Wenderoth et al.

[57] ABSTRACT

A method of manufacturing fine grain barium titanate ceramic bodies from compositions including semiconducting barium titanate ordinarily doped with $Nb_2O_5$, $Ta_2O_5$, $Sb_2O_5$, $Bi_2O_3$, $La_2O_3$, $CeO_2$, $Gd_2O_3$, $Sm_2O_3$, and $Y_2O_3$, and dielectric barium titanate. Barium sulfate is included as a starting ingredient in the barium titanate materials, and the materials are calcined and fired in a conventional manner. The resulting ceramic materials have uniform fine grain size.

5 Claims, No Drawings

METHOD OF MANUFACTURING FINE GRAIN CERAMIC BARIUM TITANATE

The invention relates to a method for manufacturing barium titanate ceramics, and more particularly to a method of making barium titanate ceramics with smaller and more uniform grain size.

Fine grained ceramic microstructure has long been of interest to those in the ceramics arts. It has been well known that the grain size of semiconducting barium titanate ceramics has a significant effect on voltage dependence of the resistivity anomaly (N. Hirose and H. Sasaki, J. AM. CERAM. SOC., 54[6]320(1971)).

A fine and uniform grain size is desirable for a small voltage dependence of resistivity anomaly and high stability during operation at high electric power loads. These characteristic properties have become increasingly important for an electric current limitor operating at a high electric load.

The prior art discloses that the grain size of semiconducting barium titanate ceramics can be controlled by the addition of some oxides, for example, $SiO_2$, $GeO_2$ or $Al_2O_3$. This addition technique according to the prior art makes the grain size smaller than $10\mu$, but lowers disadvantageously the positive temperature coefficient of electric resistance.

The method of the present invention is applicable not only to semiconducting ceramic $BaTiO_3$, but also to dielectric ceramic $BaTiO_3$ which has a high electric resistivity and a high dielectric constant. It has been known that the grain size of dielectric barium titanate ceramics has a significant effect on temperature dependence of the dielectric constant near the Curie temperature. A fine and uniform grain size is desirable for small temperature dependence of a high dielectric constant near the Curie temperature. This characteristic property has become important for a capacitor having a high capacitance, small size, and high reliability.

An object of this invention is to provide a method for manufacturing barium titanate ceramics having a small and uniform grain size.

A further object of this invention is to provide a method for manufacturing semiconducting barium titanate ceramics having a large positive temperature coefficient of electric resistivity and a small voltage dependence of the resistivity anomaly.

Another object of this invention is to provide a method for manufacturing dielectric barium titanate ceramics having a small grain size which results in a small temperature dependency of the dielectric constant near the Curie temperature.

These and other objects of this invention will be apparent upon consideration of the following detailed description.

A method for manufacturing barium titanate ceramics according to the present invention comprises the steps of providing a final mixture of (a) 98.00 to 99.95 weight % of a primary mixture with a composition equivalent to $BaTiO_3$ and (b) 0.05 to 2.00 weight % of $BaSO_4$, forming said final mixture into a given form and firing the formed final mixture at a temperature of 1,260°C to 1,400°C for 0.5 to 5 hours.

Said primary mixture referred to herein can be a mixture of 50 mol % of titanium dioxide and 50 mol % of barium oxide or a barium compound which is converted into barium oxide upon firing at a high temperature, such as barium carbonate, or can be finely divided particles of barium titanate, $BaTiO_3$. Also included within the expression "equivalent to $BaTiO_3$" are compositions which are mainly $BaTiO_3$, buth which have been slightly modified by added ceramic materials or by the replacement of some of the Ba or Ti atoms.

When said barium titanate ceramics are for use in a PTC thermistor having a positive temperature coefficient of electrical resistivity, the above described primary mixture must be modified so that it has composition of 99.9 to 99.995 wt. % of $BaTiO_3$ and 0.005 to 0.5 wt. % of one oxide selected from the group consisting of $Nb_2O_5$, $Ta_2O_5$, $Sb_2O_3$, $Bi_2O_3$, $La_2O_3$, $CeO_2$, $Gd_2O_3$, $Sm_2O_3$ and $Y_2O_3$.

When it is necessary to change the Curie temperature of barium titanate ceramics, said primary mixture of $BaTiO_3$ is modified in such a way that 1 to 35 atom % of Ba or 1 to 20 atom % of Ti is replaced by equivalent amount of Sr or Pb or by an equivalent amount of Sn or Zr in accordance with the prior art.

The addition of $BaSO_4$ in an amount less than 0.05 wt. % to said primary mixture with a composition equivalent to $BaTiO_3$ does not have any perceptible novel effect in lowering the grain size of the barium titanate ceramic down to a size less than 10 microns. When $BaSO_4$ in an amount higher than 2.00 weight % is added to said primary mixture, even in which Ba or Ti has been replaced, the resultant barium titanate ceramic has an impaired dissipation factor ($\tan\delta$). The addition of $BaSO_4$ in an amount greater than 2.00 weight % to said primary mixture which has been modified for use in a PTC thermistor causes the resultant barium titanate ceramic to lose its PTC characteristics.

The modified primary mixture is admixed with $BaSO_4$ to form said final mixture of 98.00 to 99.95 weight % of said modified mixture and 0.05 to 2.00 weight % of $BaSO_4$. In the final mixture, the $BaTiO_3$ can be composed of finally divided particles of $BaTiO_3$ or of a mixture of 50 mol % of titanium dioxide and 50 mol % of barium oxide or a compound which is converted to barium oxide during firing such as barium carbonate.

Said final mixture can be prepared by two methods. One is to mix together all of the necessary ingredients at once by any suitable and available manner, such as wet ball milling. Another is to provide said modified mixture by any suitable and available method to calcine said modified mixture at a temperature of 1000° to 1200°C and add the necessary amount of $BaSO_4$ to the calcined mixture in order to obtain a final mixture which is homogeneous in composition. It has been discovered according to the present invention that a better result is obtained with the lastmentioned method including the calcination process.

Each step of the novel method according to the present invention can be achieved by any suitable and available method.

The aforesaid primary mixture with the desired composition is prepared by mixing well all of the necessary ingredients by any suitable method such as a well ball mill. The primary mixture is calcined in air at a temperature of 1,000°C to 1,200°C for a time period of 2 hours. The calcined mixture is crushed by any suitable method, such as wet ball milling, while the required amount of $BaSO_4$ is added in order to obtain the aforesaid final mixture having a homogeneous composition. Said final mixture is dried, admixed with a binder such as a polyvinyl alcohol solution, and granulated by a well known method, such as a spray drying method. The granulated mixture is pressed into a desired form such as a disc. The pressed body is fired in air at a temperature of 1,260°C to 1,400°C for a time period of 0.5 to 5 hours to form the resultant barium titanate ceramic. If necessary, in order to make the process simple, the calcination process can be omitted. In such a case, said final mixture is prepared by mixing together all the ingredients, including $BaSO_4$, by any suitable and available method such as wet ball milling.

EXAMPLES 27 samples (Table I) of semiconducting barium titanate were prepared by standard ceramic processing steps as described above. Samples 1, 10, 19 and 25 were prepared by "conventional processing," i.e. without the addition of $BaSO_4$. The other samples were prepared by the process of the invention, i.e., with the addition of barium sulfate after the calcination and in the amounts indicated.

The fired pellets were observed on an electron microscope and the grain sizes were determined. In-Ga electrodes were attached on both surfaces of pellets and the specific resistivity of the ceramic pellets were measured at a function of temperature and applied voltage. As can be seen in Table 1, the grain sizes were reduced with increasing amounts of barium sulfate, and at the same time the resistivities at 20°C were increased. The preferred amounts of barium sulfate to be added were 0.05 to 2 weight percent for all of the basic compositions.

14 samples (Table II) of dielectric barium titanate were prepared by standard ceramic processing steps as described above. Samples 28, 35 and 42 were prepared by "conventional processing," i.e., without the addition of $BaSO_4$. The other samples were prepared by the process of the invention, i.e., with the addition of barium sulfate after the calcination and in the amounts indicated.

The fired pellets were observed on an electron microscope and the grain sizes were determined. Ag electrodes were attached on both surfaces of the pellets and the dielectric constant ($\epsilon$) and the dielectric loss (tan $\delta$) were measured at 20°C and 1 MHz. As can be seen from Table II, the grain sizes were reduced with increasing amounts of barium sulfate and at the same time, the dielectric loss at 20°C was increased. The preferred amounts of barium sulfate to be added were 0.05 to 2 weight percent.

TABLE I

| Example No. | Composition of primary mixture | Calcination conditions | Composition of final mixture (wt. percent) Primary mixture | Composition of final mixture (wt. percent) $BaSO_4$ | Final firing condition | Grain size, μm. | Resistivity (at 20° C.) Ω-cm. |
|---|---|---|---|---|---|---|---|
| 1 | | | 100 | 0 | | 30 | 30 |
| 2 | | | 99.98 | 0.02 | | 20 | 45 |
| 3 | | | 99.95 | 0.05 | | 10 | 60 |
| 4 | | | 99.90 | 0.10 | | 8 | 80 |
| 5 | 99.977 wt. percent of $BaTiO_3$ and 0.023 wt. percent of $Nb_2O_5$. | 1,000° C., 2 hours | 99.80 | 0.20 | 1,350° C., 1 hour | 8 | 90 |
| 6 | | | 99.50 | 0.50 | | 5 | 105 |
| 7 | | | 99.00 | 1.00 | | 3 | 500 |
| 8 | | | 98.00 | 2.00 | | 2 | 1000 |
| 9 | | | 97.00 | 3.00 | | 1 | $>10^6$ |
| 10 | | | 100 | 0 | | 25 | 28 |
| 11 | | | 99.98 | 0.02 | | 20 | 43 |
| 12 | | | 99.95 | 0.05 | | 10 | 60 |
| 13 | 99.5 wt. percent of $Ba(Ti_{0.97}Sn_{0.03})O_3$ and 0.5 wt. percent $Sb_2O_3$. | 1,100° C., 2 hours | 99.90 | 0.10 | 1,330° C., 1 hour | 8 | 75 |
| 14 | | | 99.80 | 0.20 | | 7 | 100 |
| 15 | | | 99.50 | 0.50 | | 6 | 100 |
| 16 | | | 99.00 | 1.00 | | 5 | 200 |
| 17 | | | 98.00 | 2.00 | | 3 | 350 |
| 18 | | | 97.00 | 3.00 | | 1 | $>10^6$ |
| 19 | | | 100 | 0 | | 20 | 80 |
| 20 | | | 99.95 | 0.05 | | 15 | 110 |
| 21 | 99.72 wt. percent of $(Ba_{0.95}Sr_{0.05})TiO_3$ and 0.28 wt. percent of $La_2O_3$. | 1,150° C., 2 hours | 99.90 | 0.10 | 1,360° C., 1 hour | 10 | 135 |
| 22 | | | 99.50 | 0.50 | | 8 | 180 |
| 23 | | | 99.00 | 1.00 | | 5 | 250 |
| 24 | | | 98.00 | 2.00 | | 3 | 700 |
| 25 | | | 100 | 0 | | 35 | 25 |
| 26 | 99.69 wt. percent of $(Ba_{0.98}Pb_{0.02})TiO_3$ and 0.31 wt. percent of $Gd_2O_3$. | 1,050° C., 2 hours | 99.5 | 0.5 | 1,300° C., 1 hour | 10 | 80 |
| 27 | | | 99.0 | 1.0 | | 7 | 125 |

TABLE II

| Example No. | Composition of primary mixture | Calcination conditions | Composition of final mixture (wt. percent) Primary mixture | Composition of final mixture (wt. percent) $BaSO_4$ | Final firing conditions | Grain size μm. | $\epsilon$ (20° C., 1 mHz.) | Tan $\delta$ (20° C., 1 mHz.) |
|---|---|---|---|---|---|---|---|---|
| 28 | | | 100 | 0 | | 100 | 1300 | 0.011 |
| 29 | | | 99.95 | 0.05 | | 15 | 1700 | 0.011 |
| 30 | | | 99.90 | 0.10 | | 10 | 2000 | 0.013 |
| 31 | $BaTiO_3$ | 1,100° C., 2 hours | 99.50 | 0.50 | 1,380° C., 1 hour | 8 | 2500 | 0.015 |
| 32 | | | 99.00 | 1.00 | | 6 | 2900 | 0.020 |
| 33 | | | 98.00 | 2.00 | | 4 | 3150 | 0.045 |
| 34 | | | 95.00 | 5.00 | | 2 | 3900 | 0.150 |
| 35 | | | 100 | 0 | | 25 | 8000 | 0.003 |
| 36 | | | 99.95 | 0.05 | | 10 | 7800 | 0.003 |
| 37 | 99.8 wt. percent of $Ba(Ti_{0.88}Sn_{0.12})O_3$ and 0.2 wt. percent of $MnO_2$. | 1,100°C., 2 hours | 99.90 | 0.10 | 1,360° C., 1 hour | 8 | 7500 | 0.005 |
| 38 | | | 99.50 | 0.50 | | 5 | 7500 | 0.008 |
| 39 | | | 99.00 | 1.00 | | 2 | 7200 | 0.012 |
| 40 | | | 98.00 | 2.00 | | 1 | 7000 | 0.030 |
| 41 | | | 95.00 | 5.00 | | 0.8 | 6800 | 0.100 |
| 42 | | | 100 | 0 | | 20 | 7400 | 0.003 |
| 43 | | | 99.95 | 0.05 | | 10 | 7300 | 0.004 |
| 44 | 99.8 wt. percent of $(Ba_{0.7}Sr_{0.3})TiO_3$ and 0.2 wt. percent $MnO_2$. | 1,150° C., 2 hours | 99.90 | 0.10 | 1,400° C., 1 hour | 8 | 7100 | 0.005 |
| 45 | | | 99.50 | 0.50 | | 6 | 7000 | 0.007 |
| 46 | | | 99.00 | 1.00 | | 3 | 6900 | 0.011 |
| 47 | | | 98.00 | 2.00 | | 1 | 6700 | 0.030 |
| 48 | | | 95.00 | 5.00 | | 0.8 | 6500 | 0.100 |

What is claimed is:

1. A method of manufacturing barium titanate ceramics comprising providing a final mixture of (a) 98.00 to 99.95 weight % of a primary mixture having a composition equivalent to $BaTiO_3$, and (b) 0.05 to 2.00 weight % of $BaSO_4$, forming said final mixture into a desired shape and firing the thus formed final mixture at a temperature of 1,260° to 1,400°C for 0.5 to 5 hours.

2. A method as claimed in claim 1 wherein said primary mixture has a composition, consisting essentially of 99.5 to 99.995 weight % of $BaTiO_3$ and 0.005 to 0.5 weight % of one oxide selected from the group consisting of $Nb_2O_5$, $Ta_2O_5$, $Sb_2O_3$, $Bi_2O_3$, $La_2O_3$, $CeO_2$, $Gd_2O_3$, $Sm_2O_3$ and $Y_2O_3$.

3. A method as claimed in claim 2 wherein said primary mixture is calcined at a temperature of 1000 to 1200°C and then admixed with 0.05 to 2.00 weight % of $BaSO_4$.

4. A method as claimed in claim 1 wherein said composition has 1 to 35 atom % of Ba replaced by an equivalent amount of one element selected from the group consisting of Sr and Pb.

5. A method as claimed in claim 1 wherein said composition has 1 to 20 atom % of Ti replaced by an equivalent amount of one element selected from the group consisting of Sn and Zr.

* * * * *